(12) United States Patent
Harper (10) Patent No.: US 7,350,854 B2
(45) Date of Patent: Apr. 1, 2008

(54) REAR FENDER AND REAR CARRIER BAR

(75) Inventor: Bryan Harper, Newnan, GA (US)

(73) Assignee: Yamaha Motor Mfg. Corp. of America, Newnan, GA (US)

( * ) Notice: Subject to any disclaimer, the term of this patent is extended or adjusted under 35 U.S.C. 154(b) by 515 days.

(21) Appl. No.: 11/150,764

(22) Filed: Jun. 10, 2005

(65) Prior Publication Data

US 2006/0289215 A1    Dec. 28, 2006

(51) Int. Cl.
*B60R 27/00* (2006.01)
(52) U.S. Cl. .................. 296/198; 224/401; 224/423; 224/454
(58) Field of Classification Search ............. 296/198; 224/401, 413, 423, 454, 456
See application file for complete search history.

(56) References Cited

U.S. PATENT DOCUMENTS

| | | | |
|---|---|---|---|
| 4,300,706 A * | 11/1981 | Hendrick et al. ........... 224/412 |
| 4,440,330 A * | 4/1984 | Goodman ................... 224/452 |
| 6,460,907 B2 | 10/2002 | Usui |
| 2003/0066853 A1* | 4/2003 | Herbert ..................... 224/401 |
| 2004/0216935 A1 | 11/2004 | Yamamoto |
| 2004/0251288 A1* | 12/2004 | Hancock et al. ........... 224/401 |
| 2007/0241157 A1* | 10/2007 | Godshaw et al. .......... 224/583 |

OTHER PUBLICATIONS

Yamaha brochure, 2005 Sport ATVs.
Yamaha brochure, 2005 Rhino 660 Automatic 4×4.
Yamaha brochure, 2005 Utility ATVs.

* cited by examiner

*Primary Examiner*—Lori L. Lyjak
(74) *Attorney, Agent, or Firm*—Keating & Bennett, LLP (57) ABSTRACT

An all terrain vehicle includes a main body and a rear fender mounted on a rear portion of the main body. The rear fender includes a rear central portion and two lateral portions extending from the rear central portion. The rear central portion of the rear fender defines a carrier surface with no bars or other members disposed on or above the carrier surface defined by the rear central portion of the rear fender. The rear central portion of the rear fender having a length that is greater than a width thereof. The rear carrier bar is arranged substantially parallel to, when viewed from above, at least a portion of an outer periphery of the rear central portion of the rear fender.

32 Claims, 7 Drawing Sheets

REAR FENDER AND REAR CARRIER BAR

BACKGROUND OF THE INVENTION

1. Field of the Invention

The present invention relates to all-terrain vehicles. More specifically, the present invention relates to a rear fender and a rear carrier bar for all-terrain vehicles.

2. Description of the Related Art

Figure 1A:
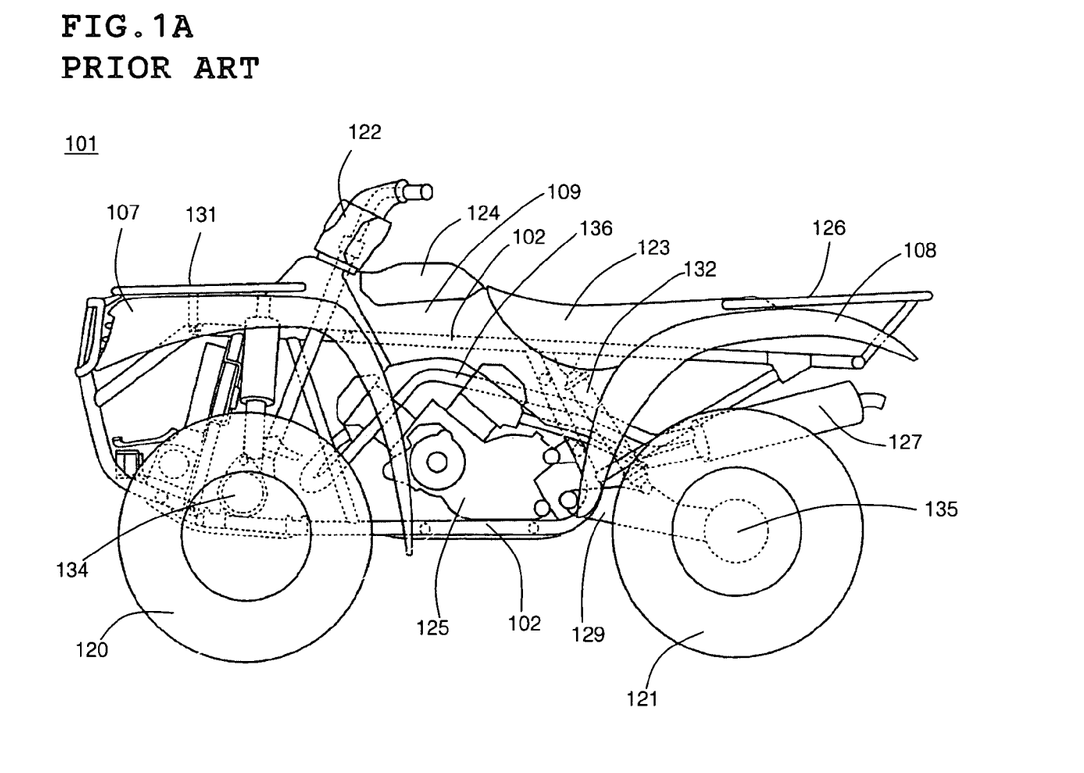
FIG. 1A is a side view of a known ATV.
Figure 1B:
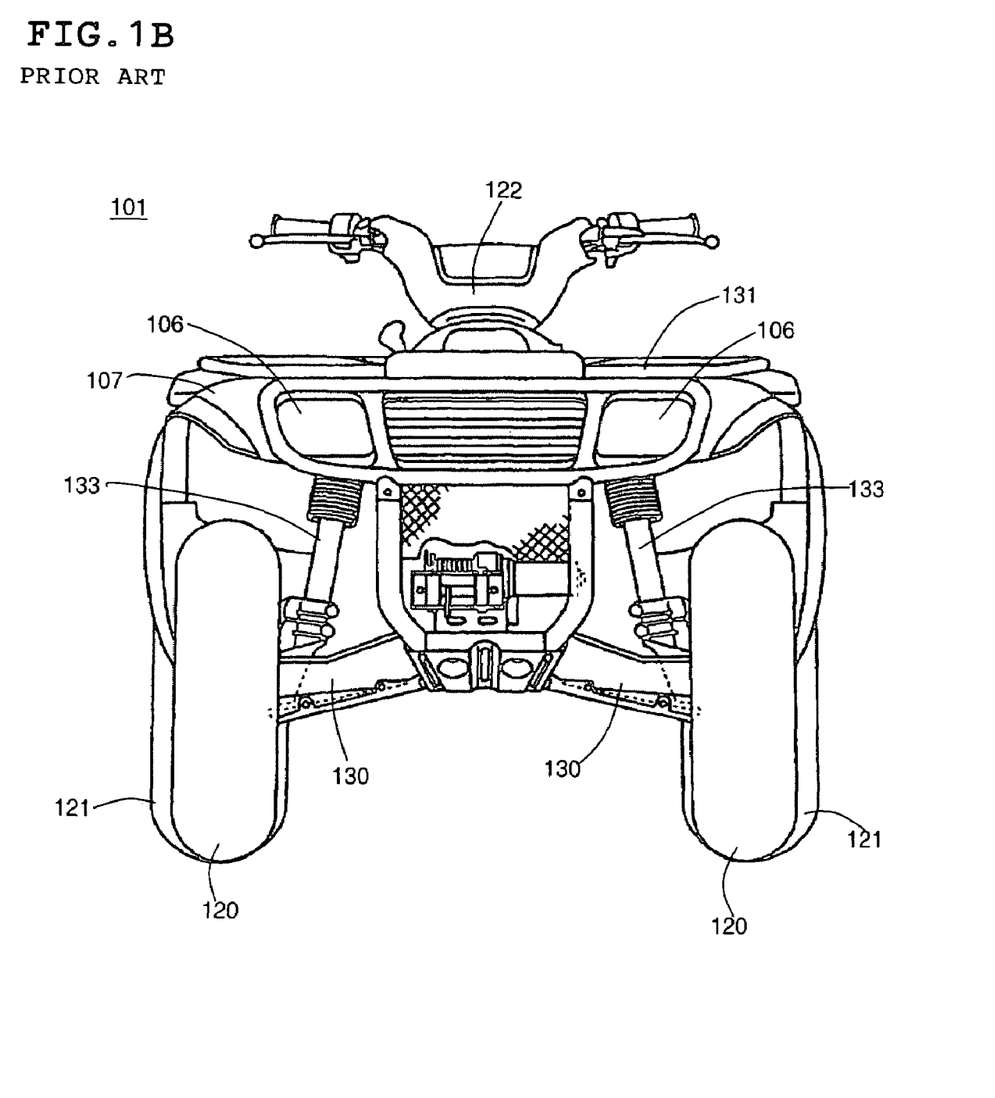
FIG. 1B is a front view of a known ATV.
Figure 1C:
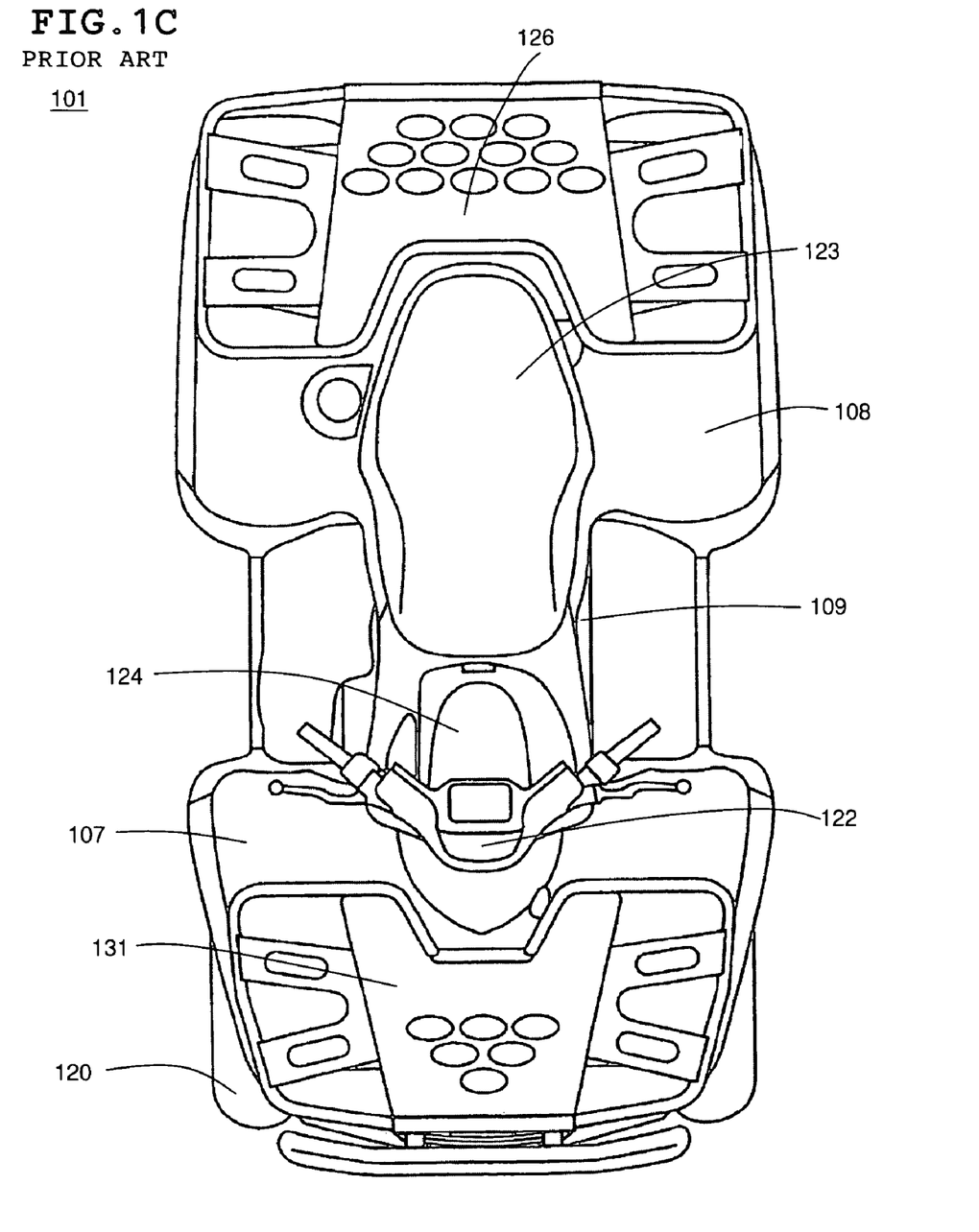
FIG. 1C is a top view of a known ATV.

FIGS. 1A, 1B, and 1C illustrate a known all-terrain vehicle (ATV) 101. The ATV 101 includes a body frame 102 formed mostly of pipe members assembled by welding. An engine 125 is mounted on a middle portion of the body frame 102. Front wheels 120 provided with low-pressure tires, i.e., balloon tires, are suspended from front right and front left portions of the body frame 102. Rear wheels 121 provided with low-pressure tires are suspended from rear right and rear left portions of the body frame 102. The rear wheels 121 are supported on rear end portions of a swing arm 129 pivotally joined to a rear lower end portion of the body frame 102 for swinging motion in a vertical plane and supported by a suspension system 132. The front wheels 120 are supported by right and left linkages 130 individually connected to a front lower end portion of the body frame 102 and supported by shock absorbers 133 so as to be able to swing in a vertical plane. The handlebar 122 is operated to control the front wheels 120 for steering.

As shown in FIG. 1A, the front wheels 120 and the rear wheels 121 are driven by a transmission including drive shafts, not shown, and differential gears 134 and 135 connected to the engine 125 and mounted on the body frame 102. A front carrier rack 131 is mounted on the front fender 107 and permits loading and supporting of baggage thereon from the front side of the ATV 101. Front fender 107 also encloses a pair of headlights 106, as shown in FIG. 1B. The front carrier rack 131, the handlebar 122, the fuel tank 124, and the seat 123 are arranged on the body frame 102 in that order from the front toward the rear of the body frame 102. A rear carrier rack 126 is disposed behind the seat 123 and is mounted on the rear fender 108.

The front wheels 120 are covered with the front fender 107. The rear wheels 121 are covered with the rear fender 108. A cover 109 is provided on the body frame 102 between the front fender 107 and the rear fender 108 so as to surround the fuel tank 124. Exhaust pipes 136 extend rearward from the exhaust ports of the cylinders of the engine 125 and are connected to the muffler 127.

One problem with ATV 101 is that the rear carrier rack 131 adds weight to the ATV 101 because it is made from a heavy material, for example a metal. Another problem with the ATV 101 is that additional manufacturing steps must be made in order to secure the rear carrier rack 131 to the ATV 101. In addition, the addition of the rear carrier rack 131 requires extra parts, extra assembly and takes away from the aesthetic appearance of the ATV 101.

Figure 2:
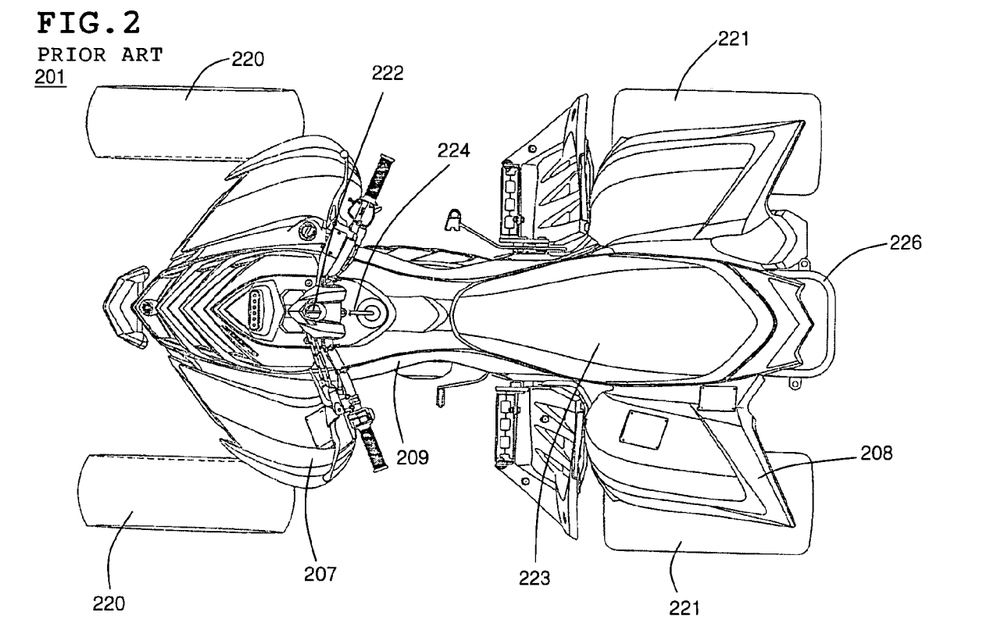
FIG. 2 is a top view of another known ATV.

FIG. 2 illustrates another known ATV 201. ATV 201 includes a pair of font wheels 220 and a pair of rear wheels 221. The body of ATV 201 includes a front fender 207, a rear fender 208, and a cover 209 connecting the front fender 207 and the rear fender 208. The handlebar 222, the fuel tank 224, the seat 223, and the rear bar 226 are arranged in that order from the front toward the rear of the ATV 201. The rear bar 226 is provided only for supporting the weight of the ATV 201 when the ATV is stored in a vertically upright position, as opposed to the horizontal operation position.

A problem with ATV 201 is that there is no place to mount or carry items. For example, there is no place on ATV 201 to attach a cooler. In the front of the ATV 201, the front fender 207 is sloped at such an angle that no item can be securely and safely attached thereto. Although a rear bar 226 is provided in the rear of the ATV 201, there is no space or carrying member provided between the end of the seat 223 and the central portion of rear fender 208 to attach or secure an item for carrying the item. In the middle of the ATV 201, there is no safe place to secure an item because it would interfere with the rider's ability to safely operate the ATV 201.

SUMMARY OF THE INVENTION

To overcome the problems described above, preferred embodiments of the present invention provide a rear carrier portion of an ATV that is easily formed, less expensive, lighter in weight, and has a much better appearance.

According to a preferred embodiment of the present invention, a vehicle includes a rear fender including a rear central portion and two lateral portions extending from the rear central portion, the rear central portion of the rear fender defines a carrier surface with no bars or other members disposed on or above the carrier surface defined by the rear central portion of the rear fender, and a rear carrier bar arranged to surround an outer periphery of the rear central portion of the rear fender.

It is preferable that the rear central portion of the rear fender having a length that is greater than a width thereof.

It is also preferable that rear carrier bar is arranged substantially parallel to, when viewed from above, at least an outer periphery of the rear central portion of the rear fender.

The rear carrier bar is preferably disposed slightly above a plane defined by the carrier surface of the rear fender.

The rear central portion of the rear fender preferably includes a plurality of ridges arranged in the carrier surface and may be reinforced by fiberglass.

The rear fender preferably includes two recessed portions that are located below opposite ends of the rear carrier bar that are attached to a body frame of the vehicle.

In one preferred embodiment, no portion of the rear fender is located directly below the rear carrier bar.

The carrier surface is preferably made of plastic and the rear carrier bar is preferably made of metal. The carrier surface may be reinforced with fiberglass and may include ridges.

The rear carrier bar is preferably arranged to surround the rear central portion such that securing members can be removably attached to the rear carrier bar to hold down objects on the carrier surface of the rear central portion of the rear fender. In this case, the rear carrier bar is preferably disposed slightly above a plane defined by the carrier surface of the rear fender, and the rear central portion of the rear fender preferably includes a plurality of ridges arranged in the carrier surface.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Figure 3:
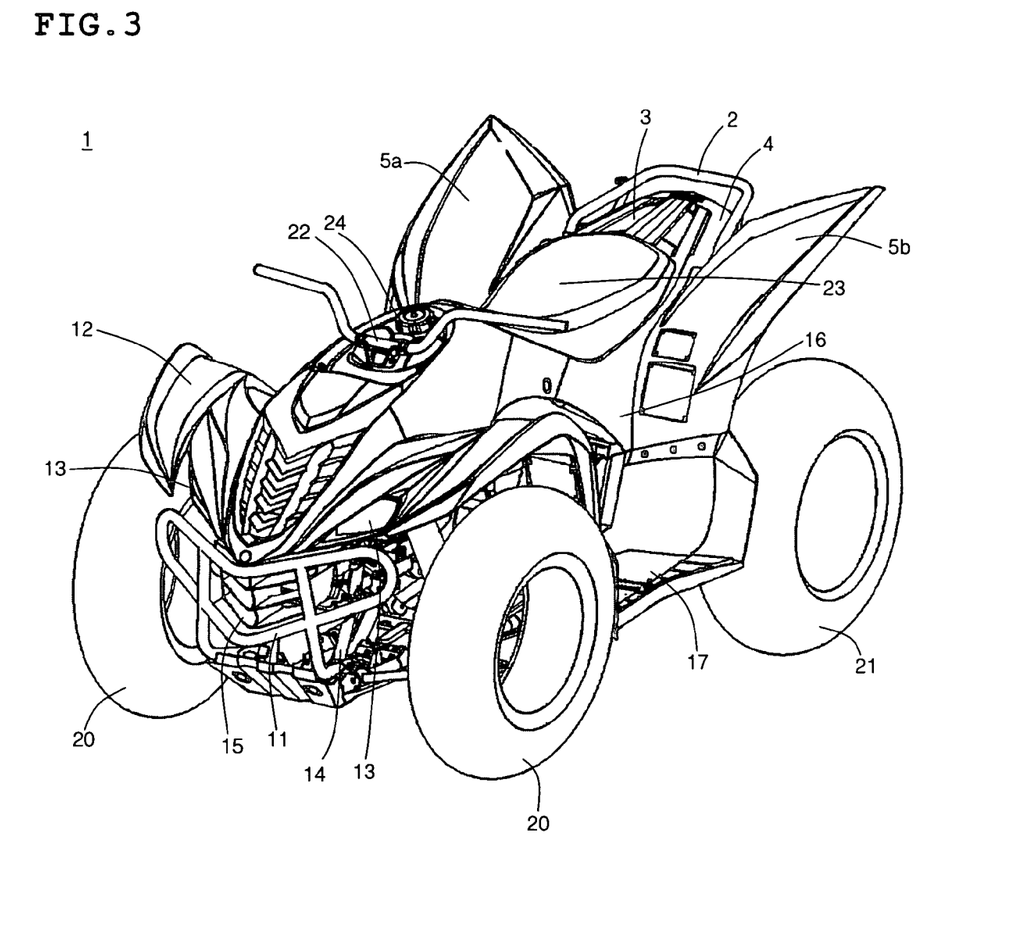
FIG. 3 is an isometric view of an ATV with a rear fender and rear carrier bar according to a preferred embodiment of the present invention.

FIG. 3 illustrates ATV 1 that includes a rear carrier bar 2 and a rear fender 3 according to the preferred embodiment of the present invention. The ATV 1 includes a pair of front wheels 20 and a pair of rear wheels 21 (only one rear wheel is shown in FIG. 3).

ATV 1 includes handlebars 22 for steering the front wheels 20. A substantially v-shaped front carrier bar 11 is connected the body frame 14 of the ATV 1. Directly behind the substantially v-shaped carrier bar 11 is an air shroud 15 for improving the air flow to the engine cooling apparatus (not shown). The front fender 12 is located above the air shroud 15. ATV 1 also includes a pair of headlights 13 that are located next to the front fender 12.

The fuel tank 24 is located next to the handlebars 22. The seat 23 is located behind and adjacent to the fuel tank 24. The rear carrier bar 2 and the rear fender 3 are located at the rear of the ATV 1, behind the seat 23. The rear fender 3 and front fender 12 are connected by cover 16. Also, foot rests 17 are connected to the front fender 12 and the rear fender 3 on each side of the seat 23.

Figure 4A:
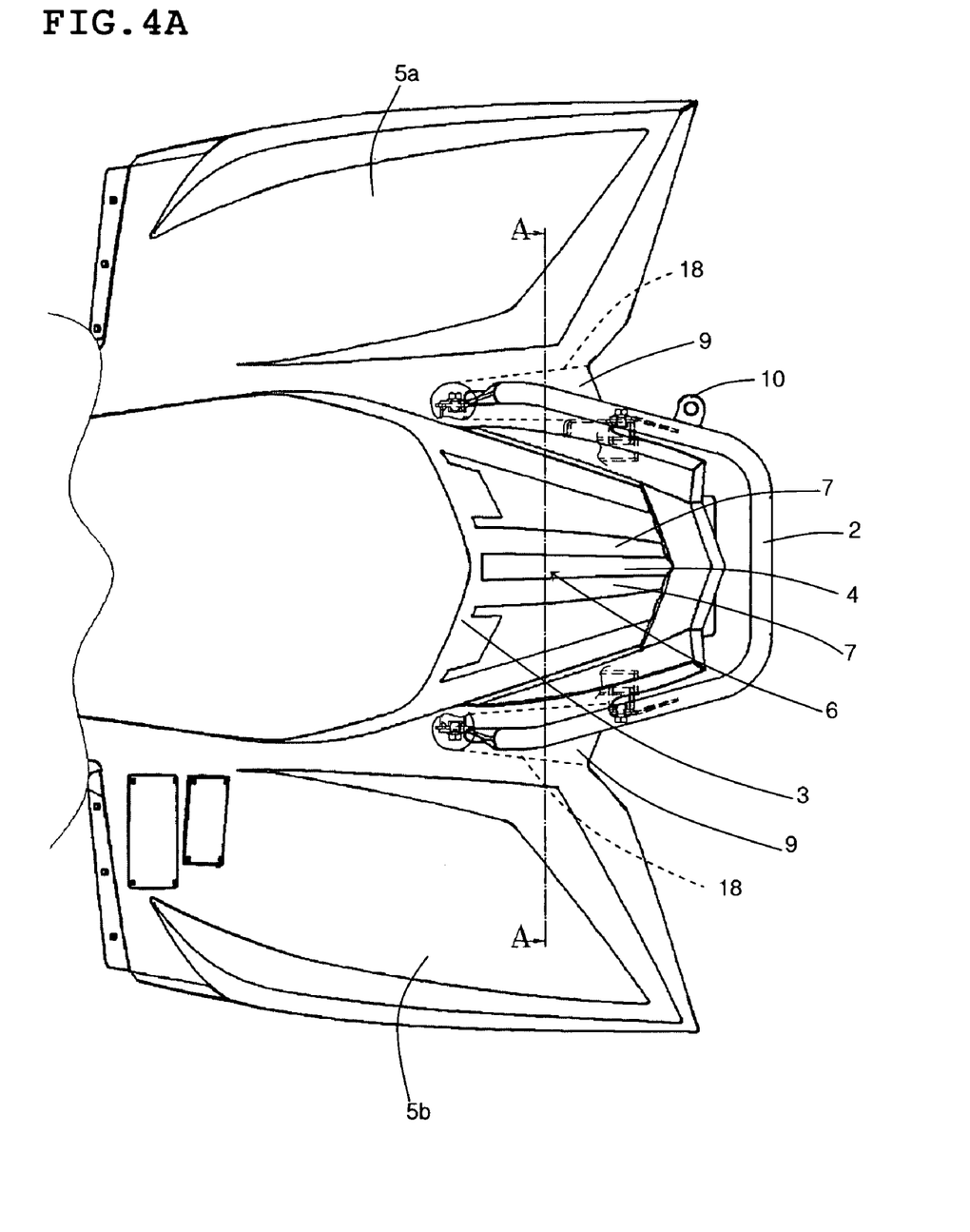
FIG. 4A is top view of the rear fender and rear carrier bar according to a preferred embodiment of the present invention.
Figure 4B:
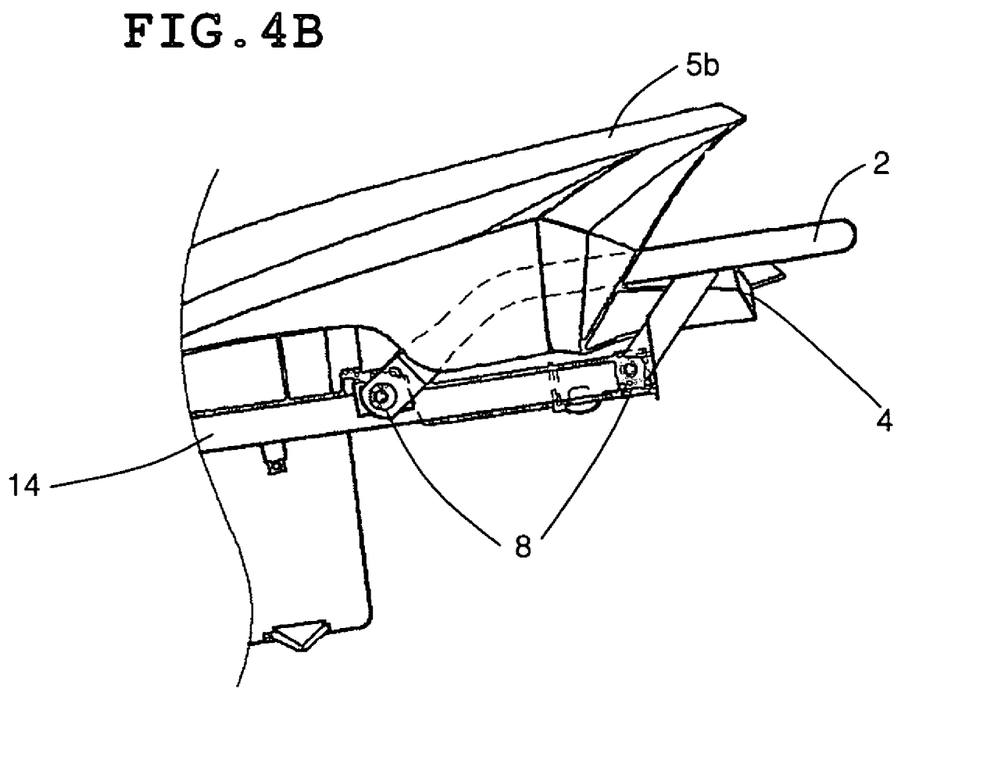
FIG. 4B is side view of the rear fender and rear carrier bar according to a preferred embodiment of the present invention.
Figure 4C:
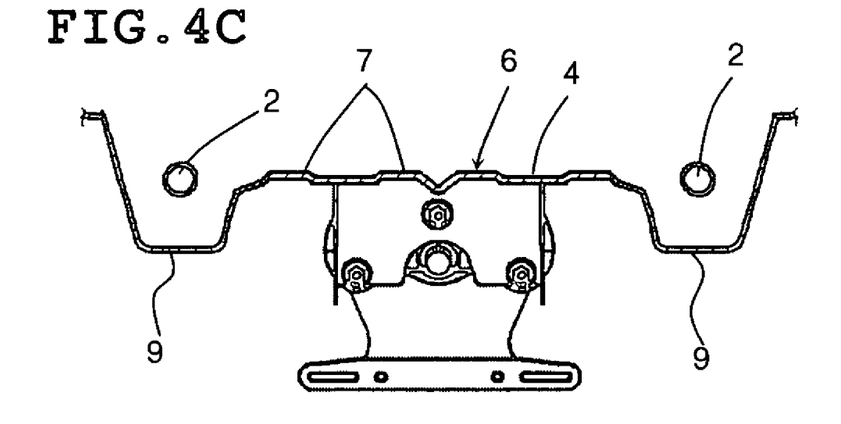
FIG. 4C is sectional view along line A-A of FIG. 4A of the rear fender and rear carrier bar according to a preferred embodiment of the present invention.

FIG. 4A is a top view of the rear of the ATV 1; FIG. 4B is a side view of the rear of the ATV 1; and FIG. 4C is a sectional view along line A-A in FIG. 4A. The rear fender 3 includes lateral portions 5a and 5b and central portion 4. No bars or other members are disposed on or above the carrier surface 6 of the rear fender 3 such that items may be carried on the carrier surface 6 of the rear fender 3 during the operation of the ATV 1. For example, a rider (not shown) can place an item, for example, a cooler, on the carrier surface 6 of the central portion 4 of the rear fender 3. The rear carrier bar 2 is arranged to surround the peripheral edge of the central portion 4. The rear carrier bar 2 is arranged such that the item placed on the carrier surface 6 of the central portion 4 can be secured, for example with a rope, a bungee cord, or any other suitable means, to the rear carrier bar 2.

As shown in FIG. 4A, the length (the direction from front to back of the ATV 1) of the central portion 4 is preferably longer than the width (the direction perpendicular to the length) of the central portion 4. However, the length of central portion 4 of the rear fender 3 could be the same as or shorter than the width of central portion 4 of the rear fender 3.

Also as seen in FIG. 4A, the rear carrier bar 3 can also include a flag carrier 10.

As seen in FIGS. 4A and 4C, the rear fender 3 includes two recessed portions 9 that are located adjacent to opposite ends of the carrier bar 2. The rear fender 3 does not need to include the recessed portions 9. That is, no portion of the rear fender 3 is required to be located below the rear carrier bar 2. As seen in FIG. 4A, the portion of the rear fender 3 defined by dashed lined 18 need not be provided.

As seen in FIGS. 4B and 4C, the rear carrier bar 2 is generally located in the same plane defined by the carrier surface 6 of the rear fender 3. As seen in FIG. 4C, the top portion of the rear carrier bar 2 is preferably slightly above the plane defined by the carrier surface 6 of the rear fender 3. However, the rear carrier bar 2 may be located at or slightly below the plane defined by the carrier surface 6 of the rear fender 3. As seen in FIG. 4B, the rear carrier bar 2 is preferably attached to the body frame 14 by four bolts 8 (only two bolts are shown). However, the body frame 14 can be attached in any suitable manner, for example welding.

The rear fender 3, including the central portion 4, may be made of plastic, including molded plastic, or any other suitable material. The rear carrier bar 2 may be made of metal or any other suitable material. The central portion 4 can include ridges 7 that provide extra rigidity to the central portion 4. The central portion 4 can also be reinforced with fiberglass (not shown). By adding ridges 7 and by reinforcing the central portion 4, heavier items may be secured on the carrier surface 6 of the central portion 4.

With the unique structure and arrangement of preferred embodiments of the present invention shown in FIGS. 3-4C, the use of the expensive, heavy, cumbersome and awkward-appearing rear carrier rack is avoided. Accordingly, a rear carrier portion of an ATV is easily formed, less expensive and lighter in weight, and provides a much better appearance.

It should be understood that the foregoing description is only illustrative of various preferred embodiments of the present invention. Various alternatives and modifications can be devised by those skilled in the art without departing from the present invention. Accordingly, the present invention is intended to embrace all such alternatives, modifications and variations that fall within the scope of the appended claims.

What is claimed is:

1. A vehicle comprising:
   a rear fender including a rear central portion and two lateral portions extending from the rear central portion, the rear central portion of the rear fender defines a carrier surface with no bars or other members disposed on or above the carrier surface defined by the rear central portion of the rear fender; and
   a rear carrier bar arranged to surround an outer periphery of the rear central portion of the rear fender.

2. The vehicle according to claim 1, wherein the rear carrier bar is disposed slightly above a plane defined by the carrier surface of the rear fender.

3. The vehicle according to claim 1, wherein the rear central portion of the rear fender includes a plurality of ridges arranged in the carrier surface.

4. The vehicle according to claim 1, wherein the rear fender includes two recessed portions that are located below opposite ends of the rear carrier bar that are attached to a body frame of the vehicle.

5. The vehicle according to claim 1, wherein no portion of the rear fender is located directly below the rear carrier bar.

6. The vehicle according to claim 1, wherein the carrier surface is made of plastic.

7. The vehicle according to claim 1, wherein the rear carrier bar is made of metal.

8. The vehicle according to claim 1, wherein the rear carrier bar is arranged to surround the rear central portion such that securing members can be removably attached to the rear carrier bar to hold down objects on the carrier surface of the rear central portion of the rear fender.

9. A vehicle comprising:
- a rear fender including a rear central portion and two lateral portions extending from the rear central portion, the rear central portion of the rear fender defines a carrier surface with no bars or other members disposed on or above the carrier surface defined by the rear central portion of the rear fender, and the rear central portion of the rear fender having a length that is greater than a width thereof; and
- a rear carrier bar arranged substantially parallel to, when viewed from above, at least an outer periphery of the rear central portion of the rear fender.

10. The vehicle according to claim 9, wherein the rear carrier bar is disposed slightly above a plane defined by the carrier surface of the rear fender.

11. The vehicle according to claim 9, wherein the rear central portion of the rear fender includes a plurality of ridges arranged in the carrier surface.

12. The vehicle according to claim 9, wherein the rear fender includes two recessed portions that are located below opposite ends of the rear carrier bar that are attached to a body frame of the vehicle.

13. The vehicle according to claim 9, wherein no portion of the rear fender is located directly below the rear carrier bar.

14. The vehicle according to claim 9, wherein the carrier surface is made of plastic.

15. The vehicle according to claim 9, wherein the rear carrier bar is made of metal.

16. The vehicle according to claim 9, wherein the rear carrier bar is arranged to surround the rear central portion such that securing members can be removably attached to the rear carrier bar to hold down objects on the carrier surface of the rear central portion of the rear fender.

17. A vehicle comprising:
- a main body;
- a rear fender mounted on a rear portion of the main body, the rear fender including a rear central portion and two lateral portions extending from the rear central portion, the rear central portion of the rear fender defines a carrier surface with no bars or other members disposed on or above the carrier surface defined by the rear central portion of the rear fender; and
- a rear carrier bar arranged to surround an outer periphery of the rear central portion of the rear fender.

18. The vehicle according to claim 17, wherein the rear carrier bar is disposed slightly above a plane defined by the carrier surface of the rear fender.

19. The vehicle according to claim 17, wherein the rear central portion of the rear fender includes a plurality of ridges arranged in the carrier surface.

20. The vehicle according to claim 17, wherein the rear fender includes two recessed portions that are located below opposite ends of the rear carrier bar that are attached to a body frame of the vehicle.

21. The vehicle according to claim 17, wherein no portion of the rear fender is located directly below the rear carrier bar.

22. The vehicle according to claim 17, wherein the carrier surface is made of plastic.

23. The vehicle according to claim 17, wherein the rear carrier bar is made of metal.

24. The vehicle according to claim 17, wherein the rear carrier bar is arranged to surround the rear central portion such that securing members can be removably attached to the rear carrier bar to hold down objects on the carrier surface of the rear central portion of the rear fender.

25. A vehicle comprising:
- a main body;
- a rear fender mounted on a rear portion of the main body, the rear fender including a rear central portion and two lateral portions extending from the rear central portion, the rear central portion of the rear fender defines a carrier surface with no bars or other members disposed on or above the carrier surface defined by the rear central portion of the rear fender, and the rear central portion of the rear fender having a length that is greater than a width thereof; and
- a rear carrier bar arranged substantially parallel to, when viewed from above, at least a portion of an outer periphery of the rear central portion of the rear fender.

26. The vehicle according to claim 25, wherein the rear carrier bar is disposed slightly above a plane defined by the carrier surface of the rear fender.

27. The vehicle according to claim 25, wherein the rear central portion of the rear fender includes a plurality of ridges arranged in the carrier surface.

28. The vehicle according to claim 25, wherein the rear fender includes two recessed portions that are located below opposite ends of the rear carrier bar that are attached to a body frame of the vehicle.

29. The vehicle according to claim 25, wherein no portion of the rear fender is located directly below the rear carrier bar.

30. The vehicle according to claim 25, wherein the carrier surface is made of plastic.

31. The vehicle according to claim 25, wherein the rear carrier bar is made of metal.

32. The vehicle according to claim 25, wherein the rear carrier bar is arranged to surround the rear central portion such that securing members can be removably attached to the rear carrier bar to hold down objects on the carrier surface of the rear central portion of the rear fender.

* * * * *